United States Patent
Balmer

(10) Patent No.: US 6,757,775 B2
(45) Date of Patent: Jun. 29, 2004

(54) BATCH METHOD FOR ACCESSING IDE DEVICE TASK REGISTERS

(75) Inventor: Keith Balmer, Bedford (GB)

(73) Assignee: Texas Instruments Incorporated, Dallas, TX (US)

( * ) Notice: Subject to any disclaimer, the term of this patent is extended or adjusted under 35 U.S.C. 154(b) by 422 days.

(21) Appl. No.: 09/964,924

(22) Filed: Sep. 26, 2001

(65) Prior Publication Data

US 2002/0065995 A1 May 30, 2002

(30) Foreign Application Priority Data

Oct. 13, 2000 (GB) .............................................. 0025104

(51) Int. Cl.[7] .............................................. G06F 13/12
(52) U.S. Cl. ..................................... 710/307; 710/305
(58) Field of Search .............................. 710/62, 65, 66, 710/74, 305, 307; 711/111

(56) References Cited

U.S. PATENT DOCUMENTS

| | | | |
|---|---|---|---|
| 5,581,715 A | * 12/1996 | Verinsky et al. .............. | 714/48 |
| 5,630,075 A | 5/1997 | Joshi et al. | |
| 5,701,450 A | 12/1997 | Duncan | |
| 5,802,392 A | * 9/1998 | Epstein et al. .................. | 710/4 |
| 6,061,510 A | 5/2000 | Klein et al. | |
| 6,128,717 A | * 10/2000 | Harrison et al. ............ | 711/202 |
| 6,513,105 B1 | * 1/2003 | Pontius ...................... | 711/209 |
| 6,584,527 B2 | * 6/2003 | Verinsky et al. ............ | 710/305 |

* cited by examiner

*Primary Examiner*—Xuan M. Thai
(74) *Attorney, Agent, or Firm*—Robert D. Marshall, Jr.; W. James Brady, III; Frederick J. Telecky, Jr.

(57) ABSTRACT

The method maps at least one intermediate data register of a first data width into the address space of the computer bus. The computer bus writes data to an intermediate data registers with write strobes corresponding to data subsets of a second smaller data width equal to the data width of the device registers. The IDE controller then transfers data from the intermediate data register to the device registers in subsets of the device register data width in a fixed order of device registers. Similarly, for reads of the device register, the computer bus writes data to a read selection data field of an intermediate data register. Each bit of the read selection data field corresponding to one device register. The IDE controller transfers data from the device registers corresponding to bits of the read selection data field having a predetermined first digital state to an intermediate data register in a fixed read order of device registers.

18 Claims, 2 Drawing Sheets

FIG. 3

| BIT | Name | Reset Value | Type |
|---|---|---|---|
| 31 | RES | 0 | R |
| 30 | RES | 0 | R |
| 29 | RES | 0 | R |
| 28 | RES | 0 | R |
| 27 | RES | 0 | R |
| 26 | RES | 0 | R |
| 25 | RES | 0 | R |
| 24 | RES | 0 | R |
| 23–16 | BATCHWRITE | 00000000 | R |
| 15 | RES | 0 | R |
| 14 | RES | 0 | R |
| 13 | RES | 0 | R |
| 12 | RES | 0 | R |
| 11 | RES | 0 | R |
| 10 | RES | 0 | R |
| 9 | RES | 0 | R |
| 8 | RES | 0 | R |
| 7–0 | BATCHREAD | 00000000 | R W/WP |

FIG. 4

| BIT | Name | Reset Value | Type |
|---|---|---|---|
| 31 | EMPTYINT | 0 | R WC |
| 30 | BURSTINT | 0 | R WC |
| 29 | PREINT | 0 | R WC |
| 28 | RES | 0 | R |
| 27 | RES | 0 | R |
| 26 | RES | 0 | R |
| 25 | RES | 0 | R |
| 24 | BATCHINT | 0 | R WC |
| 23 | EMPTYINTEN | 0 | RW |
| 22 | BURSTINTEN | 0 | RW |
| 21 | PREINTEN | 0 | RW |
| 20 | RES | 0 | R |
| 19 | RES | 0 | R |
| 18 | RES | 0 | R |
| 17 | RES | 0 | R |
| 16 | BATCHINTEN | 0 | RW |
| 15–8 | VERSION | 00000000 | R |
| 7 | CBLID | X | R |
| 6 | RES | 0 | R |
| 5 | RES | 0 | R |
| 4 | RES | 0 | R |
| 3 | BLSTOK | 0 | R |
| 2 | BLSTEN | 0 | R WP |
| 1 | ATAHI | X | RW |
| 0 | RESETATA | 1→0 | RW WP |

RESET VALUE (X: EXTERNALLY DEFINED)

BATCH METHOD FOR ACCESSING IDE DEVICE TASK REGISTERS

This application claims priority to Great Britain Application Serial No. 0025104.1, filed Oct. 13, 2000 (TI-30971GB).

TECHNICAL FIELD OF THE INVENTION

The technical field of this invention is that of peripheral control in a computer system.

BACKGROUND OF THE INVENTION

This invention relates to an Integrated Device Electronics (IDE) controller interfacing a computer bus to an IDE device. The IDE standard governs the exchange of data between a computer bus and the IDE peripheral. The typical IDE peripheral is a hard disk drive. In the IDE standard various control functions are accessed via task registers which are memory mapped into the address space of the computer bus.

Task registers in IDE devices are accessed individually and in series. A read or write of a single register can take as long as 600 ns in ATA mode 0. These task registers are generally mapped into the system address space. A read or write at a particular address will be recognized by an IDE controller as a request to access a particular IDE device task register. This IDE controller will initiate a sequence of operations to access the addressed task register. In the case of a task register read, the computer bus and the device requesting the task register access, which is typically a computer central processing unit (CPU), will be tied-up waiting for the task register access to complete. In the case of a single data write, the IDE controller may buffer the data to be written to the task register upon receipt and release the bus. The write can be completed in the background by the IDE controller. In the case of a data read there is an additional delay for the data stored in the task register to be returned. A series of back-to-back task register writes experience similar lock-up periods as a series of reads, because each new write cannot begin to the IDE device until the previous write has completed. The time taken to complete a write is about the same as that for a read. In either case a task register access can lock-up the computer bus and the other device for many cycles. This cycles represent wasted performance at today's computer system speeds. As system speeds increase in the future, the number of wasted cycles can only increase.

SUMMARY OF THE INVENTION

This disclosure describes an enhancement to an IDE controller which allows multiple task register access requests to be quickly initiated. These requests are then completed by the IDE controller without locking-up precious system resources. An indication of their completion is then made available. In the case of multiple task register reads the read-data can then be read at a time convenient to the system.

The method maps at least one intermediate data register of a first data width into the address space of the computer bus. The computer bus writes data to an intermediate data registers with write strobes corresponding to data subsets of a second smaller data width equal to the data width of the device registers. The IDE controller then transfers data from the intermediate data register to the device registers in subsets of the device register data width. The subsets transferred correspond to write strobes. This data transfer employs a fixed order of device registers.

A write status data field of one of the intermediate data registers enables tracking the data transfers. This write status data field is initially written to a first digital state corresponding to the write strobes. Each bit is changed to the opposite digital state upon completion of transfer of data from the intermediate data register to the device register. The IDE controller may issue a selectively enabled interrupt when all the bits are in the opposite digital state upon completion of the data transfer. The IDE controller may also set a completion bit.

For reads of the device register, the computer bus writes data to a read selection data field of an intermediate data register. Each bit of the read selection data field corresponding to one device register. The IDE controller transfers data from the device registers corresponding to bits of the read selection data field having a predetermined first digital state to an intermediate data register. The device register data may then be read from the intermediate data registers via the computer bus. This device register read has a fixed read order of device registers. The individual bits of the read selection data field are changed to an opposite digital state upon completion of transfer of data the said device register to the intermediate data register. Upon completion of the data transfer the IDE may issue an interrupt or set a completion bit.

BRIEF DESCRIPTION OF THE DRAWINGS

These and other aspects of this invention are illustrated in the drawings, in which:

FIG. 3 illustrates the definitions of the bits of the Batch Control register; and FIG. 4 illustrates the definitions of the bits of the System Control register.

DETAILED DESCRIPTION OF PREFERRED EMBODIMENTS

Figure 1:
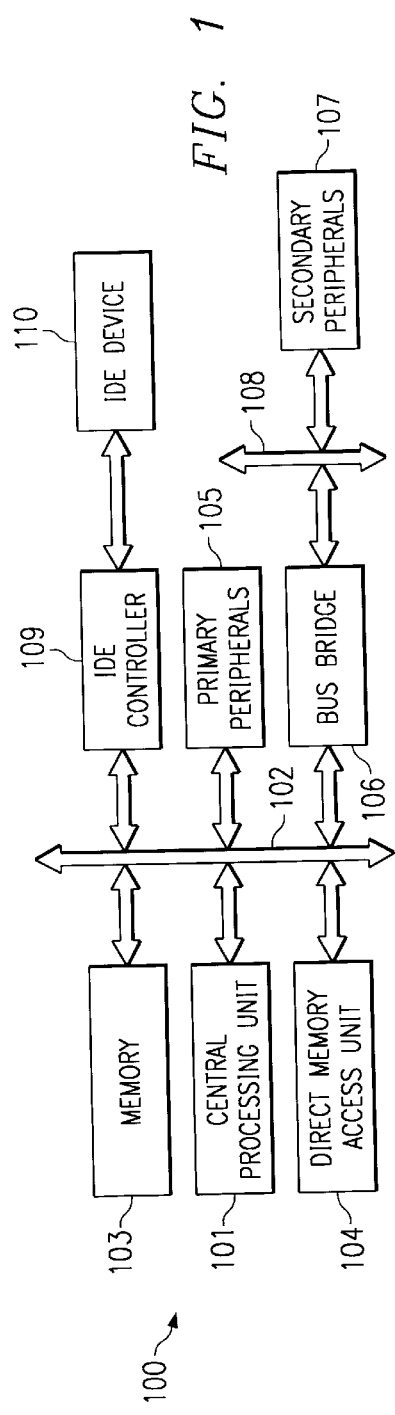
FIG. 1 illustrates a typical computer system to which this invention is applicable.

FIG. 1 is a block diagram of a typical computer system 100 to which this invention is applicable. Computer system 100 includes central processing unit (CPU) 101, system memory 103 and direct memory access (DMA) unit 104 each connected to system or CPU bus 102. Also connected to bus 102 is one or more primary peripherals 105. A bus bridge 106 serves to connect one or more secondary peripherals 107 on secondary bus 108 to system bus 102. Lastly, IDE controller 109 connects IDE device 110 to system bus 102. In the typical computer system 100, IDE device 110 is a hard disk drive.

Figure 2:
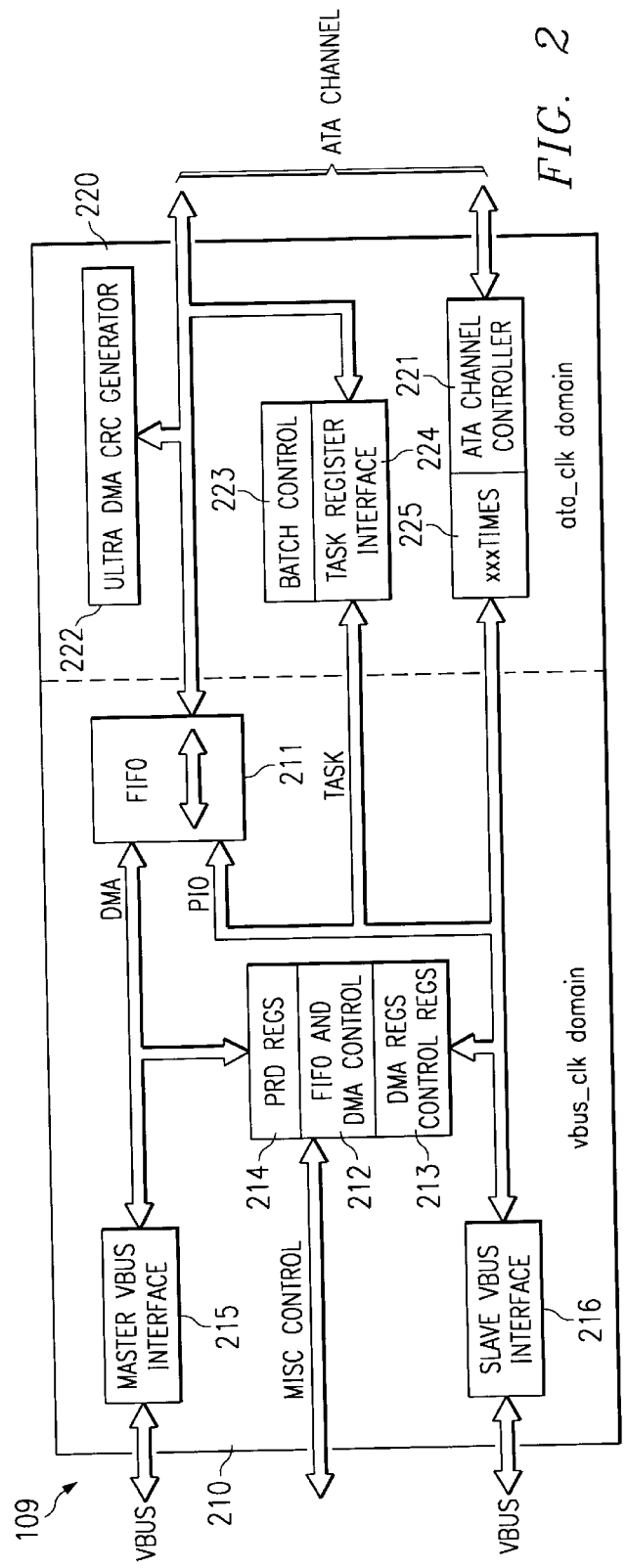
FIG. 2 illustrates the construction of the IDE controller of this invention.

FIG. 2 illustrates a block diagram of IDE controller 109. FIG. 2 shows only the major sub-blocks and the data paths between them. IDE controller 109 is preferably compliant with the ATA/ATAP1-4 standard was well as operating in accordance with the invention as described below. IDE controller serves an interface between a known VBUS type computer bus and the known ATA/ATAPI channel. Note in this example, IDE controller 109 includes an integral DMA unit equivalent to DMA unit 104 illustrated in FIG. 1. This DMA unit requires VBUS master interface 215 for operation. An embodiment including a separate DMA unit, such as DMA unit 104 illustrated in FIG. 1, would omit the DMA controller portion of FIFO and DMA controller 213 and VBUS master interface 215.

IDE controller 109 includes two clock domains. The vbus_clk domain 210 includes: first-in-first-out (FIFO) memory 211; FIFO and DMA controller 212 and its control registers 213; physical region descriptor (PRD) registers 214; a VBUS master interface 215; and a VBUS slave interface 216. The ata_clk domain 220 includes: ATA channel controller 221; cyclic redundancy check generator 222; batch control task registers 223 with their task register interface 224; and three Times registers 225.

Not illustrated in FIG. 2 is synchronization and handshake logic that straddles the boundary between vbus_clk domain 210 and ata_clk domain 220. This handshake logic limits the relative clock speed ratio between the two clock domains. This handshake logic support a vbus_clk speed range of 25 MHz to 100 MHz when ata_clk is running at 15 ns/cycle (66.6 MHz). The two clock domains vbus_clk domain 210 and ata_clk domain 220 permit IDE controller 109 to be used in a application where VBUS runs at a frequency other than 66 MHz.

IDE device 110 is controlled by writes to task registers within IDE controller 109. All task registers are accessed using chip select slave_vbus_req0. This chip select is be decoded to a block of 64-bytes, aligned to a 64-byte boundary. Table 1 shows the mapping of addresses to individual registers for a big endian memory order example. Note that the IDE task registers each have two memory mappings. These permit two different type accesses as will be detailed below.

TABLE 1

| Address | Byte 3 | Byte 2 | Byte 1 | Byte 0 |
|---|---|---|---|---|
| 00 00xx | PIO MS half-word | | PIO LS half-word | |
| 00 00xx | Sector Number | Sector Count | Error-R Features-W | Data Port |
| 00 01xx | Status-R Command-W | Device/ Head | Cylinder High | Cylinder Low |
| 00 10xx | Reserved | | | |
| 00 11xx | Reserved | Alt Stat-R Dev Cont-W | Reserved | Reserved |
| 01 00xx | Sector Number | Sector Count | Error-R Features-W | Alt Stat-R Dev Cont-W |
| 01 01xx | Status-R Command-W | Device/ Head | Cylinder High | Cylinder Low |
| 01 10xx | Reserved | | | |
| 01 11xx | Batch Control | | | |
| 10 00xx | IDE Task Register Transfer Timing | | | |
| 10 01xx | PIO Data Mode Timing | | | |
| 10 10xx | DMA Timing | | | |
| 10 11xx | Reserved | | | |
| 11 00xx | Reserved | DMA Status | Reserved | DMA Command |
| 11 01xx | DMA PRD Table Base Address | | | |
| 11 10xx | FIFO Control | | | |
| 11 11xx | System Control | | | |

The address column shows the 6 least significant (LS) bits of the VBUS byte address. The 2 LS bits (xx) are not presented on the VBUS address lines but are replaced by byte enable signals. Note that the address model used has the smallest addressable memory location as a byte while the VBUS addresses are 32-bit word oriented. The little endian addresses and register definitions are similar except that the data order within each 32-bit word is reversed.

The definitions of the various fields are given below. These definitions are generally presented in address-space order.

The PIO MS half-word is the most significant 16 bits of the peripheral input/output (PIO) data word. Similarly, PIO LS half-word is the least significant 16 bits of the PIO data word. This field permits access to the IDE Data Port through FIFO 211. These access occur only when both the byte strobes of both byte 0 and byte 2 are active. Thus the PIO MS half-word cannot be accessed without also accessing the PIO LS half-word. These two fields are always accessed by the VBUS as 16-bits wide. On a read if FIFO 211 is either empty or contains only 16-bits of data, then the VBUS will stall until sufficient 16-bit PIO read(s) have been performed to place 32 bits of data into FIFO 211. On a write if FIFO 211 does not have room for 32-bits of data, then the VBUS will stall until space is available. On a read when FIFO 211 is empty, the IDE device 110 is read until a whole word (32 bits) of data is available for the read. On a write, then the data written into FIFO 211 will subsequently be written to the device IDE Data Port. Further writes may be made into FIFO 211 until it is full. The VBUS will then stall on a further write until space is available. FIFO 211 can only operate in one direction at a time. Thus FIFO 211 must be empty before switching from PIO reads to PIO writes, or vice versa.

The address 00 00xx is accessed differently depending on the status of the respective byte strobes. Note that the Data Port begins at byte 0 of the first address. If the byte strobe for byte 0 is active then a PIO access will be performed. This access will be 16 bits if byte-strobe 2 is inactive or 32 bits if byte-strobe 2 is active. If however byte-strobe 0 is not active then the other three byte strobes determine which IDE Task register is accessed as detailed below. This technique enables the base address 00 00xx to be multiplexed between peripheral input/output data and IDE task registers.

The Sector Number data at byte 3 of address 00 00xx and at byte 3 of address 00 00xx is the IDE Sector Number Register. This is a read/write register Reading from this byte will read the last value read from an IDE Sector Number register. Writing to this byte will initiate a write to the Sector Number register.

The Sector Count data at byte 2 of address 00 00 xx and at byte 2 of address 01 00xx is the IDE Sector Count Register. This is a read/write register. Reading from this byte will read the last value read from an IDE Sector Count register. Writing to this byte will initiate a write to the Sector Count register.

The Error/Features data at byte 1 of address 00 00xx and at byte 1 of address 00 01xx has a different meaning depending upon whether it accessed by a read or by a write. When read, this byte is Error, which is an IDE Error Register. Reading from this byte will read the last value read from an IDE Error register. When written to, this byte is Features, which is an IDE Features Register. Writing to this byte will initiate a write to the Features register.

The data at byte 0 of address 00 00xx is called the Data Port. The byte strobe of this byte is used to multiplex the peripheral input/output data and the IDE task registers Sector Number, Sector Count and Error/Features in a manner already described.

The Status/Command data at byte 3 of address 00 01xx and at byte 3 of address 00 11xx has a different meaning depending upon whether it accessed by a read or by a write. When read, this byte is Status, which is the IDE Status Register. Reading from this byte will read the last value read from an IDE Status register. When written to, this byte is Command, which is the IDE Command Register. Writing to this byte will initiate a write to the IDE Command register of the IDE device 110.

The Device/Head data at byte 2 of address 00 01xx and at byte 2 address 00 11xx is the IDE Device/Head register. This is a read/write register. Reading from this byte will read the last value read from an IDE Device/Head Register. Writing to this byte will initiate a write to the IDE Device/Head Register.

The Cylinder High data at byte 1 of address 00 00xx and at byte 1 of address 01 01xx is the IDE Cylinder High Register. This is a read/write register. Reading from this byte will read the last value read from an IDE Cylinder High register. Writing to this byte will initiate a write to the Cylinder High register.

The Cylinder Low data at byte 0 of address 01 11xx and at byte 0 of address 01 01xx in the IDE Cylinder Low Register. This is a read/write register. Reading from this byte will read the last value read from an IDE Cylinder Low register. Writing to this byte will initiate a write to the Cylinder Low register.

The Alternate Status/Device Control data at byte 2 of address 00 11xx and byte 0 of address 01 00xx has a different meaning depending upon whether it accessed by a read or by a write. When read, this byte is Alternate Status, which is an IDE Alternate Status Register. Reading from this byte will read the last value read from an IDE Alternate Status register. When written to, this byte is Device Control, which is an IDE Device Control Register. Writing to this byte will initiate a write to the Device Control register.

Access to the IDE task registers Sector Number, Sector Count, Error/Features at address 00 00xx, to Status/Command, Device/Head, Cylinder High and Cylinder Low at address 00 01xx and to Alternate Status/Device Control at address 00 11xx occurs in a PC-like manner a single byte (i.e. single register) at a time. Only a single byte strobe can be active when accessing these registers. The VBUS will stall until a read is completed. The VBUS will stall if a read or write is attempted while a previous write is still pending to IDE device 110. This mode of access is called legacy mode because it is the same as the ATA/ATAP1-4 standard. This insures compatibility with the prior method of accessing the IDE task registers 224 of IDE controller 109.

All other registers are accessible 32-bits at a time via the addresses shown in Table 1. The individual byte strobes will determine which byte(s) within the register are written. In particular a single access may read from or write to the four IDE task registers Sector Number, Sector Count, Error/Features and Alternate Status/Device Control at address 01 00xx. Similarly, a single access may read from or write to the four IDE task registers Status/Command, Device/Head, Cylinder High and Cylinder Low at address 01 01 xx. Registers and bits marked reserved in Table 1 will read as zero and writing to them will have no effect.

IDE controller 109 includes two main features of the logic to implement this invention. The first feature is the second mapping of the IDE task registers noted above. The second feature is a Batch Control register for tracking task registers to be read or written. The Batch Control register memory mapped at address 01 11xx contains two fields batchread and batchwrite. Each field includes 8 bits. Each bit represents a one of the eight IDE task registers.

The batchread field is used to request the task registers to be read. A pattern of 1's corresponding to those IDE task registers to be read is written into the batchread field by the requesting device on the VBUS. The requesting device will typically be CPU 101. A single write operation is performed in a single cycle to address 01 11xx with byte strobe 0 active. IDE controller 109 then reads the requested register(s) from IDE device 110 in a fixed sequence. This data is stored in IDE controller 109 within dedicated data registers internal to IDE controller 109. This data has the memory mapped addresses shown in Table 1.

During the IDE task register read operation, as each register read completes the corresponding bit in the batchread field is cleared to zero. Thus any device poling the batchread field can track the progress of the reads. When all the requested registers have been read the batchread field will have become all-zeros. This condition can be detected either by poling the batchread field or by having IDE controller 109 interrupt CPU 101. This interrupt tells CPU 101 that the batch task register read operation has completed. The task register data can then be read quickly and in parallel by reading data registers inside IDE controller 109 at the memory mapped addresses. These registers are dedicated to holding the data read from IDE task registers.

The order in which the IDE task registers are read is preferably fixed. This order is Alternate Status, Error, Sector Count, Sector Number, Cylinder High, Cylinder Low, Device/Head and Command. This particular order is believed the most useful when accessing IDE devices.

To request a number of task registers to be written the device writes to the data registers inside IDE controller 109 corresponding to the task registers required to be written at the alternate address mapping. The writing device will typically be CPU 101. These data registers can be written in parallel via VBUS. Each register is exactly one byte wide and byte-enable signals on the system bus indicate which data register(s) are to be written within IDE device 110. When a data register within the IDE controller is written its corresponding bit in the batchwrite field is set to one. This indicates to IDE controller 109 that it should write the data to the task register in IDE device 110. Upon completion of each tack register write, IDE controller 109 clears the corresponding bit in the batchwrite field. The batchwrite field can thus be poled by CPU 101 to monitor the progress of the writes if desired.

When all the requested writes have been performed, the batchwrite field will have been cleared to all-zeros by IDE controller 109. This condition can be detected either by CPU 101 poling the batchwrite field or by IDE controller 109 interrupting CPU 101. This interrupt tells CPU 101 that the batch-write operation has completed.

The order in which the task registers are written is preferably fixed. In the preferred embodiment the order is Device Control, Features, Sector Count, Sector Number, Cylinder Low, Cylinder High, Device/Head and Command. One skilled in the art would realize that other fixed write orders are feasible and may be advantageous depending on the controlled device. Note that if an application requires a write order other than this fixed write order, then more than one IDE task register write operation may be used to obtain the desired write order.

FIG. 3 illustrates the definitions of the bits of the Batch Control register memory mapped at address 00 11xx. Bits 31 to 24 are reserved. Writes to these bits have no effect and they are always read as zeros.

Bits 23 thru 16 form the batchwrite field. The batchwrite field stores Batch Write Status Bits. These bits are read only. Writes to these bits have no effect. The batchwrite field indicates the state of progress of batch writes to the IDE task registers. Upon a batch write to the IDE task registers, a copy of the byte strobes is written into this field of the Batch Control register. Note that the byte strobes of a write to memory mapped address 01 00xx are stored in bit 19 to 16 and the byte strobes of a write to memory mapped address 01 10xx are stored in bits 23 to 20. Each bit represents the write-state of a particular IDE task register. A 1 indicates the write is pending, a 0 indicates the write is complete. As previously noted, the IDE task registers are written in a fixed order. If a batch-write is attempted while a batch read is still in progress, then the VBUS write will stall until the batch read has completed. When the batchwrite field becomes all-zeros, then a batchint bit of the System Control register will be set to 1. This allows generation of an interrupt, based upon the state of a batchinten bit of the System Control register. This will be more fully described below. The bit assignments for the batchwire field are give in Table 2:

TABLE 2

| Bit | Corresponding IDE Task Register |
|---|---|
| 16 | Device Control |
| 17 | Features |
| 18 | Sector Count |
| 19 | Sector Number |
| 20 | Cylinder Low |
| 21 | Cylinder High |
| 22 | Device/Head |
| 23 | Command |

Thus a batchwrite state of 11000100 indicates that writes are currently queued for Sector Count, then Device/Head and then Command.

Bits 15 thru 8 are reserved. Writes to these bits have no effect and they are always read as zeros.

Bits 7 thru 0 form the batchread field. The batchread field stores the Batch Read Selection Bits. These bits are designated as read/write protected if non-zero. Thus a write to this field can proceed if all these bits are 0. If any bit is a 1 the write has no effect. These bits allow the IDE Task registers to be read in a manner preventing long stalls of the VBUS. Each bit in the batchread field corresponds to an IDE Task register. Upon writing a 1 to any of these bits, IDE controller 109 will read the corresponding register into the corresponding byte of the internal registers memory mapped at addresses 01 00xx and 01 01xx. This data may be read later by via the VBUS. The write to the batchread field may select any combination of IDE task registers to be read. According to the preferred embodiment the actual read of the IDE task registers takes place in the fixed order disclosed above. Once any bit in the batchread field is written with a 1, the whole field is write-protected until all the selected register(s) have been read. Upon read of each IDE task register, the corresponding bit within the batchread field is cleared to 0. When the batchread field becomes all-zeros, the write protection clears. In addition, batchint bit of System Control register will be set to 1. This allows generation of an interrupt, based upon the state of a batchinten bit of the System Control register. This will be more fully described below. The bit assignments for the batchread field are give in Table 3:

TABLE 3

| Bit | Corresponding IDE Task Register |
|---|---|
| 7 | Alternative Status |
| 6 | Error |
| 5 | Sector Count |
| 4 | Sector Number |
| 3 | Cylinder Low |
| 2 | Cylinder High |
| 1 | Device/Head |
| 0 | Status |

Thus writing a state of 01000011 to the batchread register will cause a read of the IDE task registers Alternate Status, then Error, then Device/Head. If a batch read is attempted by writing to the batchread field while a batch write is in progress, the VBUS will stall until the batch write complete.

If any batch-read register is read at either memory mapped address 01 00xx or 01 01xx while the batchread field is non-zero, then the VBUS read will stall until all the specified task registers have been read. The byte-strobes and address are not used to decide if all the specified register has been read already.

FIG. 4 illustrates the definitions of the bits of the System Control register memory mapped at address 11 11xx. Most of the bits of this System Control register are not relevant to this invention. Bits 28 to 24, bits 20 to 17 and 6 to 4 are reserved. Writes to these bits have no effect and they are always read as zeros. The fields emptyint (FIFO Empty Interrupt, bit 31), burstint (FIFO Burst Ready Interrput, bit 30), preint (Prefetch Interrput, bit 29), emptyinten (FIFO Empty Interrupt Enable bit 23), burstinten (FIFO Burst Ready Interrupt, bit 22), preinten (Prefetch Interrupt Enable, bit 21), version (Version Number, bits 15 to 8), cblid (Cable ID Pin value, bit 7), bistok (RAM Built In Self Test Result, bit 3), bisten (RAM Built In Self Test Enable, bit 2), atahi (ATA channel High Impedance, bit 1) and atareset (ATA channel Reset, bit 0) will not be further described.

Bit 24 is called batchint and indicates a IDE Task register batch-access completed. This bit is read normally. A write of 1 to this bit clears the bit to 0. A write of 0 to this bit has o effect. IDE controller 109 sets this bit when the batchread field and batchwrite field of the Batch Control register become all-zeros. This indicates the completion of a batch IDE register reads or writes. If this interrupt is enabled via the batchinten bit, then IDE controller 109 will issue an IDE interrupt.

Bit 16 is called batchinten and indicates IDE Task register batch-access completed Interrupt Enable. When this bit is 1, the batchint interrupt is enabled. When the bit is 0, the batchint interrupt is disabled.

The batch mode is the preferred method for accessing IDE Task registers. The batch mode can avoid prolonged VBUS stalls and can also access four registers in a single VBUS read or write. IDE task registers are accessed in batch mode at addresses of address 01 10xx and 01 11xx in a slave__vbus__req0 register-space. The byte strobes are converted to the byte numbers within the addressed word and thence into ATA channel addresses.

A batch write is initiated by writing to IDE Task registers at their batch address mappings. Up to four registers can be written by a single 32-bit VBUS write. The byte strobes will indicate which registers are to be written. The byte of data destined for each register is latched and the registers will then be written serially on the ATA channel to IDE device 110. As previously described the write order is fixed. The byte strobes of the write set corresponding bits in the batchwrite field. A state machine internal to IDE controller 109 will process the write to IDE device 110 in the fixed order.

If a write via VBUS initiates a write to a IDE task register having a higher priority in the fixed write order than any pending write, then the write to that IDE task register queue-jumps and goes ahead of the earlier initiated IDE task register write on the ATA channel. If the write order is critical to the application, then this should therefore be comprehended. If a IDE task register write is re-initiated before it completes its write to IDE device 110, then the new data will overwrite the pending previous data and only one write will be performed using the new data.

The fixed write order is compatible with normal command submission in IDE devices. The Command register is the last priority and thus the last register to be written. Two 32-bit writes to the batch registers via VBUS is all that is required to submit a command. More typically, this will be a 16-bit write, followed by a 32-bit write since the Device Control and Features task registers will not often need be written.

Batch writes will generally not stall the VBUS except for clock domain handshake cycles unless a batch read is pending. In this case the VBUS will stall until all batch reads complete. This preserves the read-write submission order. Such a stall can be avoided by checking the batchread field of the Batch Control register or by waiting for a batchint interrupt. Normal command sequencing should avoid such stalls.

When an IDE Task register is read at its batch read address then the last value that was read from the device is returned on VBUS. This is the data stored in IDE controller 109. A read of the remote IDE Task register in IDE device 110 is not initiated in this manner. Such a read will not normally stall VBUS because the data bytes are returned from registers local to the IDE controller. All four registers mapped into the 32-bit word are supplied to the VBUS via slave VBUS interface 216. If CPU 101 is reading specific bytes, then it will select these itself from the appropriate byte positions.

In order to read the remote IDE Task registers into the local registers a batch read must be submitted. This is done by writing into the batchread field of the Batch Control register the bit-pattern corresponding to those registers desired to be read. IDE controller 109 will then read the remote IDE Task registers into the local batch-read registers in fixed order.

Batch reads will generally not stall the VBUS except in two circumstances. The Batch control register is write protected if the whole of Batch control is non-zero. This is, batch read or a batch write is still in progress and thus either the batchread field or the batchwrite filed is non-zero. If a write to the batchread field is attempted while a batch read or batch write is in progress, then the VBUS will stall until the pending batch operation completes and the Batch control register has become all-zero. Then the write-protection is removed. This preserves write/read order and also ensures the registers have been read in a known order.

If a IDE Task register is read at its batch location when the batchread field is non-zero, then the VBUS will stall. This ensures that the value read on VBUS is actually the latest value from the remote register and not stale information. It would be possible to examine the address and byte strobes and only stall if one of the registers being read was still pending in batchread. These stalls can be avoided by checking the Batch control register first or by using the batchint interrupt. Normal command sequencing by the driver should avoid such stalls.

When the Batch Control register changes from non-zero to all-zero, then the batchint interrupt bit of the System Control register is set to 1. If this interrupt is enabled via the batchinten bit of the System Control register, then IDE controller 109 issues and interrupt to CPU 101. Writing a 1 to the batchint bit will clear it to zero. Using such a batch interrupt to sequence IDE Task register accesses will completely avoid prolonged VBUS stalls.

The batchint interrupt bit becomes set whenever the batchread and batchwrite fields of the Batch Control register become all-zeros. This indicates that a batch operation has completed. The legacy-mode (VBUS stalling) method of accessing IDE Task registers also utilizes the same underlying hardware. Thus a bit in either the batchread field or the batchwrite fields will become set, then cleared, during each legacy-mode IDE Task register access. The batchint bit will thus be set during legacy mode accesses. The batchint interrupt can be disabled via the batchinten bit of the System Control register if necessary when performing legacy-mode accesses.

For batch reads, all required registers can be specified by a single write to the batchread field of the Batch Control register. Thus when the batchint bit becomes active all the specified IDE task registers will have been read into the local registers. This data can then be read on VBUS without any stalling.

For batch writes, if there is the possibility of interruption or delay between writing to the two batch write word addresses, then it might be possible for batchint bit to become set in between the two word writes. If this is a concern then the batchint bit should be cleared before submitting the second word. The batchint bit will then become set after completion of write of the second submitted data to the device.

What is claimed is:

1. A method of data transfer from computer bus having a first data width to device registers of second data width smaller than the first data width, the method comprising the steps of:

mapping at least one intermediate data register of the first width into the address space of the computer bus;

writing data to an intermediate data registers with write strobes corresponding to data subsets of the second data width;

transferring data from said at least one intermediate data register to device registers in subsets of said second data width, said subsets transferred corresponding to write strobes.

2. The method of claim 1, wherein:

said step of transferring data from said at least one intermediate data register to device registers transfers data in a fixed write order of device registers.

3. The method of claim 1, further comprising the steps of:

writing a first digital state to a bit within a write status data field of a second intermediate data register corresponding to said write strobes upon a write of data to at least one of said intermediate data registers; and changing corresponding individual bits of said write status data field to a second digital state opposite said first digital state upon completion of transfer of data from said at least one intermediate data register to device registers.

4. The method of claim 3, wherein:

said first digital state is 1: and said second digital state is 0.

5. The method of claim 3, further comprising the step of:

issuing an interrupt to a central processing unit connected to said computer bus when all bits of said write status data field have said second digital state.

6. The method of claim 5, further comprising the step of:

selectively enabling and disabling generation of said interrupt.

7. The method of claim 6, wherein:

said step of selectively enabling and disabling generation of said interrupt includes writing a first digital state or a second digital state in an interrupt enable bit of an intermediate data register.

8. The method of claim 3, further comprising the step of:

setting a bit of an intermediate data register to a predetermined digital state when all bits of said write status data field have said second digital state.

9. The method of claim 1, further comprising the steps of:

writing data to a read selection data field of an intermediate data register, each bit of said read selection data field corresponding to one device register;

transferring data from said device registers corresponding to bits of said read selection data field having a predetermined digital state to at least one of said intermediate data registers in increments of said second data width; and reading said at least one of said intermediate data registers via said computer bus in increments of said first width.

10. The method of claim 9, wherein:

said step of transferring data from said device registers to said at least one intermediate data register transfers data in a fixed read order of device registers.

11. A method of data transfer from device registers having a first data width to a computer of second data width larger than the first data width, the method comprising the steps of:

mapping at least one intermediate data register of the second width into the address space of the computer bus;

writing data to a read selection data field of an intermediate data register, each bit of said read selection data field corresponding to one device register;

transferring data from said device registers corresponding to bits of said read selection data field having a predetermined first digital state to at least one of said intermediate data registers in increments of said second data width; and reading said at least one of said intermediate data registers via said computer bus in increments of said second data width.

12. The method of claim 11, wherein:

said step of transferring data from said device registers to said at least one intermediate data register transfers data in a fixed read order of device registers.

13. The method of claim 11, further comprising the steps of:

changing corresponding individual bits of said read selection data field to a second digital state opposite said first digital state upon completion of transfer of data from said device register to said at least one intermediate data register.

14. The method of claim 13, wherein:

said first digital state is 1: and said second digital state is 0.

15. The method of claim 13, further comprising the step of:

issuing an interrupt to a central processing unit connected to said computer bus when all bits of said read selection data field have said second digital state.

16. The method of claim 15, further comprising the step of:

selectively enabling and disabling generation of said interrupt.

17. The method of claim 16, wherein:

said step of selectively enabling and disabling generation of said interrupt includes writing a first digital state or a second digital state in an interrupt enable bit of an intermediate data register.

18. The method of claim 13, further comprising the step of:

setting a bit of an intermediate data register to a predetermined digital state when all bits of said read selection data field have said second digital state.

* * * * *